W. L. EVANS, Jr.
METAL GLASS SETTING.
APPLICATION FILED MAR. 3, 1913.
1,199,356.
Patented Sept. 26, 1916.
2 SHEETS—SHEET 1.
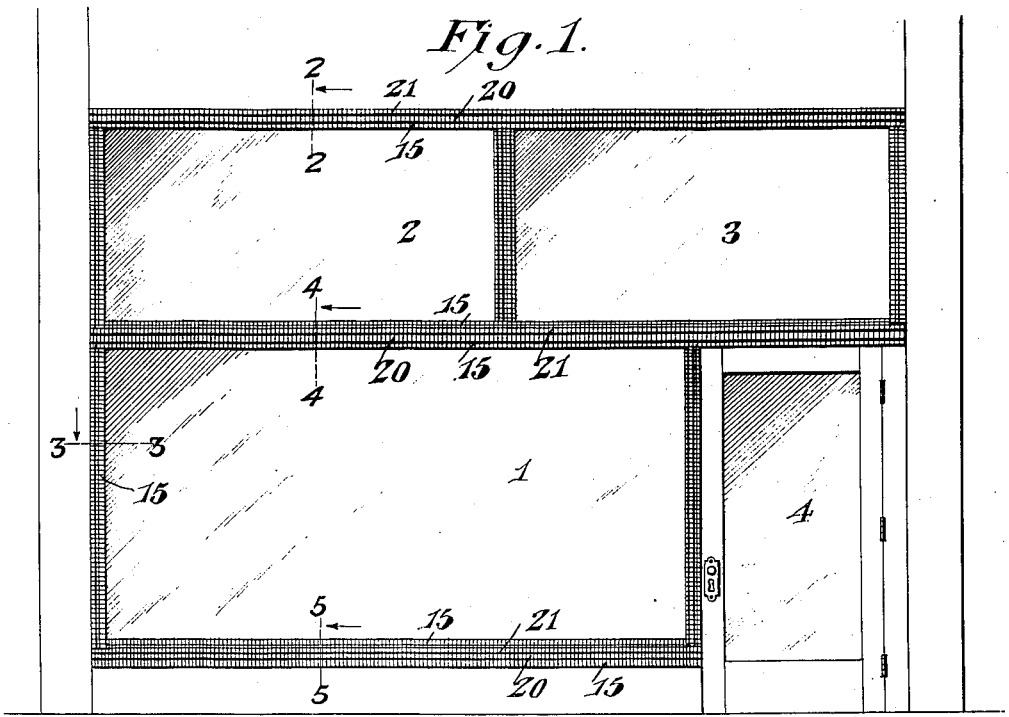
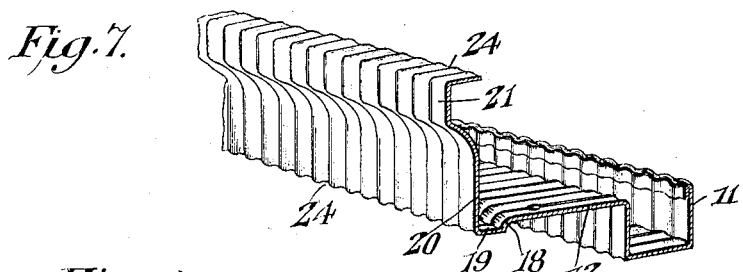
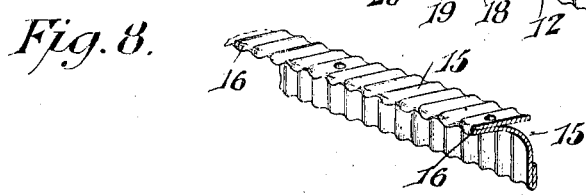
WITNESSES
William L. Evans Jr. INVENTOR
BY
ATTORNEY

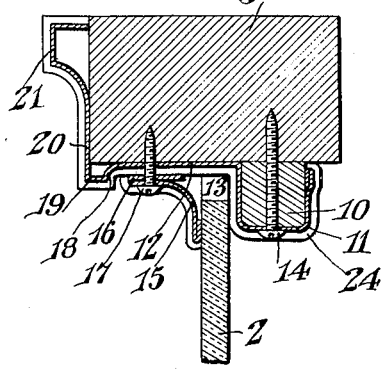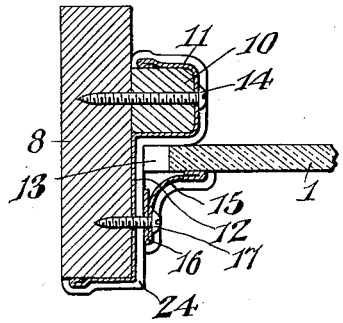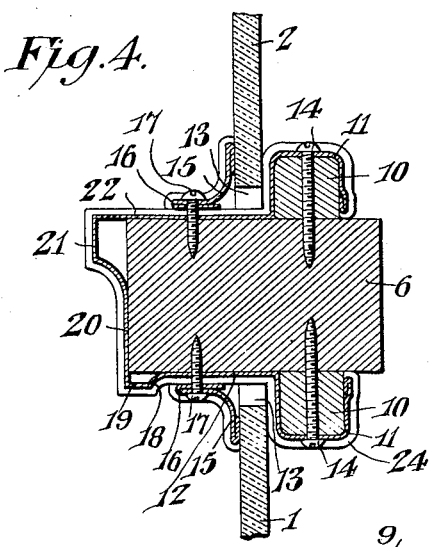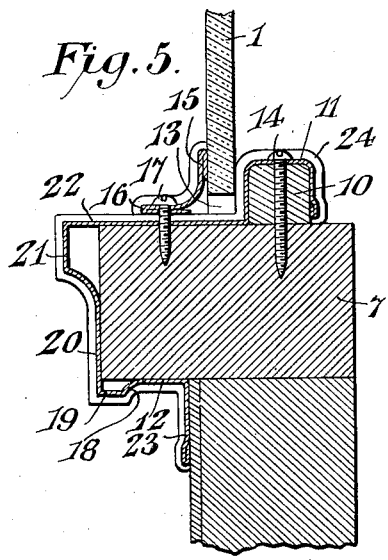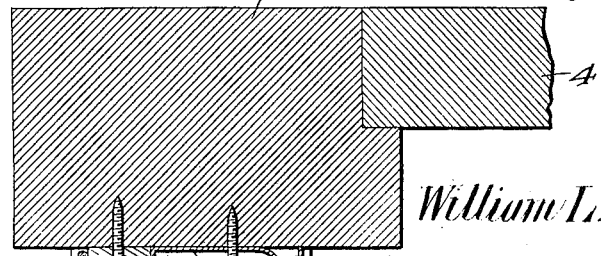

UNITED STATES PATENT OFFICE.

WILLIAM LEWIS EVANS, JR., OF WASHINGTON, INDIANA.

METAL GLASS-SETTING.

1,199,356. Specification of Letters Patent. Patented Sept. 26, 1916.

Application filed March 3, 1913. Serial No. 751,795.

*To all whom it may concern:*

Be it known that I, WILLIAM L. EVANS, Jr., a citizen of the United States, residing at Washington, in the county of Daviess and State of Indiana, have invented a new and useful Metal Glass-Setting, of which the following is a specification.

This invention has reference to improvements in glass settings, especially those made of metal, and its object is to provide a metal glass setting whereby abundant and even ventilation is provided to prevent fogging or frosting of the glass and also to provide for drainage.

In accordance with the present invention there is provided a backing support and a removable bead or molding between which the edge of the glass is clamped, one or both parts being of metal, preferably of sheet form and corrugated, the corrugations being so arranged that in all horizontal runs of the clamping members the corrugations are substantially vertical, or in general the corrugations are transverse to the length of the backing and holding bead or molding. It is customary, although not obligatory, to form the framing supports for the glass clamping members of wood, and it is also customary to extend that member of the clamping devices which is effectively stationary, so as to constitute ornamental molding or facing portions, but even that is not obligatory.

The invention is particularly adapted for securing plate glass in store fronts or in any other position where there is usually a liability of difference of temperature between the two faces of the glass, frequently resulting in the fogging of the glass by moisture that in cold weather will freeze and further obscure the glass. The present invention provides a multitude of ventilating passages all about the edges of the glass, so that there is free circulation of air and the temperature of the exposed and inner faces of the glass pane or sheet is approximately even and deposition of moisture from the air is thereby prevented, thus avoiding fogging or frosting. In the case of a storm, however, the exposed surfaces of the glass will become wet and under some circumstances the inner face of the glass may become wet, but in either instance the moisture will gravitate toward the bottom of the glass, and there find ready escape because of the many channels provided by the corrugations. Again, the corrugated metal is very sensibly stronger or stiffer than sheet metal of the same gage when uncorrugated, and the clamping members are therefore much stronger and stiffer than would be the case were the parts not corrugated and the glass may be clamped tightly without liability of subsequently loosening.

The invention will be best understood from a consideration of the following detailed description, taken in connection with the accompanying drawings forming a part of this specification, with the further understanding that while the drawings show a practical embodiment of the invention, the latter is not confined to any exact conformity with the showing of the drawings but may be changed and modified so long as such changes and modifications mark no material departure from the salient features of the invention.

In the drawings:—Figure 1 is an elevation of a store front showing the application of the invention. Fig. 2 is a section on the line 2—2 of Fig. 1. Fig. 3 is a section on the line 3—3 of Fig. 1. Fig. 4 is a section on the line 4—4 of Fig. 1. Fig. 5 is a section on the line 5—5 of Fig. 1. Fig. 6 is a horizontal section showing the glass setting adjacent an inset door or the like. Figs. 7 and 8 are detail perspectives of portions of the metal members of the glass setting shown in Fig. 2.

The present invention is not confined in use to any particular location, or to any particular arrangement wherein it is desirable to fasten glass sheets or panes, particularly plate glass or the like, in position. However, as the invention is particularly adapted for the setting of plate glass store windows various adaptations of the invention for such purpose are illustrated in the drawing without in any manner limiting the use of the invention to such particular associations.

In Fig. 1 there is shown a store front having a main window pane 1 and other panes 2, 3 above the pane 1 and at one side of the show window so produced there is an entrance door 4, which, as is quite customary in show windows, is inset to the depth of the window so that the door is either on the building line with the window projecting, or the window is on the building line with the door set back an appropriate distance. The glass panes are supported by cross rails 5, 6, 7 and upright rails 8, 9, the latter of which may form a jamb for the door 4. At appropriate points the rails 5, 6 and 7 and also the uprights 8 and 9 have strips 10 made fast thereto in any appropriate manner, and while it is not at all obligatory in the practice of the present invention that the various rails and strips mentioned should be made of wood, it is usually customary to so make them. Each strip 10 forms a backing strip for the respective glass pane 1, 2 or 3, and the strip is of such size as to extend an appropriate distance away from the rail 5, 6 or 7, or the upright 8 or 9, as the case may be, to engage to an appropriate extent the corresponding edge portion of the glass pane. Each strip 10 is covered by a sheet 11 of metal, it being customary to cover three sides of the strip which may be substantially rectangular in cross section, or to cover an equivalent proportion of the strip when it is other than rectangular in cross section. The metal sheet is continued, as shown at 12, in engagement with the corresponding face of the rail 5, 6 or 7, or the upright 8 or 9 to form an abutment for the corresponding edge of the glass pane 1, 2 or 3, as the case may be. It is not always desirable to have the edge of the glass in direct contact with the metal extension 12, wherefore blocks 13 may be introduced between the edge of the glass and the metal which might otherwise be engaged by the glass, and these blocks may be appropriately spaced apart for a purpose which will presently appear. While the metal sheet 11 may be secured to the strips 10 by screws 14 which can also serve as fastening means for the strips 10, such an arrangement is not at all obligatory and other fastening means may be substituted, so that the showing of the drawings in this respect is to be taken simply as indicative of any suitable means for the purpose.

In order to clamp the glass pane when placed against the metal covered strip 10, a metallic bead or molding 15 is provided, this bead being usually curved in cross section into shallow channel form or otherwise suitably shaped for both stiffness and ornamental purposes and the edges may be returned upon themselves, as indicated at 16, to strengthen the said edges and prevent the exposure of any raw edges. Screws 17 may be employed for holding the bead or molding in place with such pressure as may be advisable against the corresponding face of the glass near the edge thereof to force the other face of the glass against the metal covered strip 10. Furthermore, by providing a laterally curved or channel shaped retaining molding or bead with the fastening devices traversing it near the edge remote from that engaging the glass, a certain degree of elasticity or give is provided which permits a tight clamping of the corresponding edge of the glass between the bead or molding 15 and the backing strip 10 or its metallic coating 11, and the elasticity of the bead or strip 15 compensates for the shrinkage or expansion of the metal under heat or atmospheric conditions. The molding is also greatly stiffened by being corrugated laterally or at substantially right angles to its length and this also contributes to increase the clamping effect of the molding against the glass pane.

At an appropriate distance from the strip 10 the extension 12 of the metal sheet may be bent into a shoulder 18 from which the sheet is continued in a direction away from the strip 10 as an ornamental bead 19 which may constitute the terminal edge of the sheet with respect to the strip 10 as in the form shown in Fig. 6, or if this edge corresponds to the edge of one of the main timbers or supporting rails, then it may be continued around such edge as indicated at 20 in Figs. 2 and 4 and adjacent the opposite edge of the supporting timber or rail be formed into an ornamental projection 21, as in Fig. 4, and this ornamental projection may coalesce into an extension 22 of the metal coating 11 of a strip 10 when located on top of a supporting strip or timber, as the rails or timbers 6 or 7 of Figs. 4 and 5, although in the structure of Fig. 5 there is no strip 10 on the under face of the rail 7, but simply a protecting continuation of the extension 12, which continuation is indicated at 23. Wherever a metallic extension from a backing strip 10 is so located as to be on top of a supporting rail or timber, the shoulder 18 and bead 19 are omitted, and the extension 22 may terminate in any suitable manner either in an ornamental extension 21 or otherwise, but always so that there is an unimpeded passage from the respective backing strip 10 to the outer edge of the continuation 22.

All the sheet metal parts are preferably formed with corrugations 24 which not only add to the ornamental appearance, but serve two important functions, one of which is to strengthen the sheet metal so that if desired a lighter gage metal may be used than could otherwise be employed, and, moreover, providing a multitude of small channels around the clamped edge of the glass so that there is relatively free access of air from the exterior of the glass pane to the interior face thereof. The corrugations are so arranged as to extend substantially laterally of the length of the sheet metal clamping members, so that in the case of those clamping members engaging what constitute the lower edges of the glass panes when installed, there are many channels for the escape of water of condensation, or any other water which may find its way to either face of the glass. The glass is clamped about the edges from opposite faces at many closely adjacent points, which points of contact, however, are spaced apart by channels forming a multitude of passages between the exterior and interior of the glass pane or plate, so that not only is there free but uniform ventilation between the outside and inside of the window or other space closed by the glass, and any moisture which might accumulate on the interior of the glass and gravitate to the bottom thereof finds ready escape through the many channels provided, the presence of the molding 15 in no wise interfering with such escape. The chance of sweating or fogging or frosting of the interior of the glass is practically eliminated, since the abundant ventilation and its even distribution prevent any marked difference of temperature between the exposed and protected faces of the glass.

While the corrugated metal setting need not be more extensive than to include the clamping face of a strip 10 and extend therefrom a sufficient distance to accommodate the clamping strip or molding 15, the metal may be made sufficiently extensive to cover all or so great a part as may be deemed necessary of the exposed or exterior faces of the supporting rails or timbers, thus greatly adding to the ornamental effect produced. The corrugations sufficiently stiffen the sheet metal to permit the omission of the strips 10, although usually it is advantageous to retain them, and, furthermore, the corrugations so stiffen the sheet metal that it readily retains the ornamental form without liability of distortion under ordinary conditions of use.

The metal sheathing 11 for the strip 10 is in one piece with the extension 12, and moreover constitutes a channel shaped abutment for the rear surface of the installed glass pane. The setting structure is therefore stiffened by the longitudinal channel abutment 11 back of the set window pane and the bead or beads exterior to such window pane, such beads being in effect longitudinal channels. Furthermore, the setting is greatly stiffened by the longitudinal series of corrugations, which series may be coextensive with the setting while the length of each corrugation is crosswise or in the direction of the width of the setting. Thus the setting is made stiff and rigid both longitudinally and laterally and at the same time effective ventilation is obtained by reason of the corrugations. The depth of the corrugations should be sufficient for the purposes of the present invention but need not be proportionately as great as indicated in the drawings.

Certain of the advantages of the invention may be realized by using a wooden glass holding bead, say a quarter-round molding, in place of the metallic bead 15. Such wooden bead might be employed for the cheaper grades of settings.

What is claimed is:—

1. In show-window construction, a setting for a glass pane comprising an elongated member of sheet metal formed along one long side into a channel portion constituting an abutment for the rear face of the set glass pane, said elongated member being of a width to extend to and beyond the front face of the glass pane, and a removable glass-retaining bead or molding engaging the front extension of the elongated member and the front face of the glass pane to hold the latter against the abutment, the elongated member being formed with a longitudinal series of transverse corrugations for stiffening the member both longitudinally and laterally and for providing a multitude of direct ventilating passages around the corresponding edge of the set glass pane and along the abutment where engaging the glass pane.

2. In show-window construction, a setting for a glass pane comprising an elongated member of sheet metal formed along one long side into a channel portion constituting an abutment for the rear face of the said glass pane, said elongated member being of a width to extend to and beyond the front face of the said set glass pane, and a removable glass retaining bead or molding of sheet metal formed with a longitudinal series of transverse corrugations and bent into channel form and applied to the front extension of the sheet metal member and against the front face of the set glass pane to hold the latter against the abutment, said abutment portion of the sheet metal member and the front extension thereof being formed with a longitudinal series of transverse corrugations common to both whereby the setting is stiffened both longitudinally and laterally and the corrugations provide a multitude of direct ventilating passages between the interior and exterior of the window around the corresponding edge of the pane.

3. In show-window construction, a setting for a glass pane comprising an elongated strip of corrugated sheet metal bent along one long edge into an outstanding abutment portion for the corresponding part of a glass pane and with the length of the corrugations arranged crosswise or transversely of the length of said strip, and said strip being of a width to extend for a distance beyond the front face of the set glass pane, and a removable bead or molding applied to the front extension of the corrugated metal strip in holding relation to the front face of the pane of glass for clamping it against the corrugated face of the abutment.

4. In show-window construction, a setting for a glass pane comprising a substantially flat elongated sheet metal strip bent along one long edge into a channel-shaped abutment portion outstanding from one face of the strip and located interior to the installed glass pane, the flat portion of the strip being of a width to extend to and beyond the front face of the window pane and there bent into a longitudinal outstanding bead projecting from the same face of the strip as the abutment portion, and a removable channel-shaped glass retaining bead or molding engaging the front face of the glass pane opposite the abutment and also engaging the front projecting portion of the metal strip between the bead and the glass pane, said elongated metal strip being formed with a longitudinal series of transverse corrugations whereby the strip is stiffened and there is provided a multitude of direct ventilating passages around the corresponding edge of the glass pane.

5. In show-window construction, supporting rails for and in surrounding relation to a glass pane, an elongated strip of sheet metal on each rail formed along one long edge into an offstanding channel portion constituting an abutment for the glass pane and located within the window structure, the metal strip being of a width to extend to and beyond the front face of the glass pane, a filling strip for each abutment portion, fastening devices for the filling strip also traversing the metal strip at the channel portion to hold the metal strip and filling strip to the rail, and a shallow channel-shaped retaining bead or molding lodged against the outer face of the glass pane and against the forward extension of the metal strip with fastening devices traversing both the bead and the metal strip and entering the corresponding rail to hold the glass pane against the abutment, said metal strips each having a continuous longitudinal series of transverse corrugations along the face of the abutment engaging the glass pane and along the forward extension of the strip to provide a multitude of direct ventilating passages around the corresponding edges of the glass pane and along the engaging faces of the abutments between the exterior and interior of the window, at the top, bottom and sides of the glass pane.

In testimony, that I claim the foregoing as my own, I have hereto affixed my signature in the presence of two witnesses.

WILLIAM LEWIS EVANS, Jr.

Witnesses:
O. D. Calvin,
C. C. Imgenbltes.